(12) United States Patent
Harms et al.

(10) Patent No.: US 11,577,584 B2
(45) Date of Patent: Feb. 14, 2023

(54) SUN VISOR MOUNTING APPARATUS, SYSTEM, AND METHOD

(71) Applicant: Trinity Innovative Solutions, LLC, Frisco, TX (US)

(72) Inventors: Dwight David Harms, The Colony, TX (US); Timothy Francis Hall, The Colony, TX (US)

(73) Assignee: Trinity Innovative Solutions, LLC, Little Elm, TX (US)

(*) Notice: Subject to any disclaimer, the term of this patent is extended or adjusted under 35 U.S.C. 154(b) by 64 days.

(21) Appl. No.: 17/173,122

(22) Filed: Feb. 10, 2021

(65) Prior Publication Data

US 2021/0245587 A1    Aug. 12, 2021

Related U.S. Application Data

(60) Provisional application No. 62/972,485, filed on Feb. 10, 2020.

(51) Int. Cl.
*B60J 3/02* (2006.01)
*B60R 11/04* (2006.01)
*B60R 11/00* (2006.01)

(52) U.S. Cl.
CPC ............. *B60J 3/023* (2013.01); *B60J 3/0252* (2013.01); *B60R 11/04* (2013.01); *B60R 2011/0035* (2013.01)

(58) Field of Classification Search
CPC ............... B60R 7/05; B60R 2011/0035; B60R 2011/005; B60R 2011/008;

(Continued)

(56) References Cited

U.S. PATENT DOCUMENTS 1,095,953 A    5/1914  Baker
4,852,988 A    8/1989  Velez et al.
(Continued)

FOREIGN PATENT DOCUMENTS

CN         102289135 A      12/2011
JP         H08282392 A   *  10/1996
WO      WO 2012020254 A1     2/2012

OTHER PUBLICATIONS

Machine Translation of CN 102289135.

*Primary Examiner* — D Glenn Dayoan
*Assistant Examiner* — Veronica M Shull
(74) *Attorney, Agent, or Firm* — David W. Carstens; J. Andrew Reed; Carstens, Alles & Gourley, LLP (57) ABSTRACT

The present disclosure is a sun visor mounting apparatus, system or method having a mounting plate with a J hooked end configured to receive a sun visor, a securing plate opposing the J hooked end, configured in a U shape for receiving the sun visor. A joining plate configured in a V shape with a first side capable of coupling to the mounting plate, and a second side capable of coupling to an extension plate, and the extension plate can have a first side of a coupled to the joining plate, and a second side configured to engage against a fixed structure. One or more fasteners may be utilized with each plate to secure them together. To accommodate different sizes and configurations, the joining plate and extension plate may be extending to satisfactory positions, to engage with a fixed structure for the stability of the mounting plate.

19 Claims, 8 Drawing Sheets

(58) Field of Classification Search
CPC ............ B60R 11/0205; B60R 11/0211; B60R 11/0258; B60R 11/04; B60R 11/00; B60J 3/02; B60J 3/023; B60J 3/0252; B60J 3/0208; F16B 1/00; F16M 13/02
USPC ................ 296/97.5, 97.6; 224/311, 312
See application file for complete search history.

(56) References Cited

U.S. PATENT DOCUMENTS

| | | | |
|---|---|---|---|
| 5,356,192 A * | 10/1994 | Schierau | B60J 3/0208 296/97.8 |
| 10,288,217 B2 * | 5/2019 | Griggs | F16M 13/022 |
| 2008/0231744 A1 | 9/2008 | Khanna et al. | |
| 2016/0161052 A1 * | 6/2016 | Griggs | F16M 11/24 320/108 |
| 2016/0216513 A1 * | 7/2016 | Uchiyama | G02B 27/0101 |
| 2019/0306466 A1 | 10/2019 | Herrmann et al. | |

* cited by examiner

SUN VISOR MOUNTING APPARATUS, SYSTEM, AND METHOD

CROSS-REFERENCE TO RELATED APPLICATIONS

This application claims the benefit of U.S. Provisional Application No. 62/972,485, filed Feb. 10, 2020 entitled "Sun Visor Mounting Apparatus, System, and Method," the disclosure of which is incorporated herein by reference.

BACKGROUND

Technical Field

The present disclosure relates to mounting systems for cameras and related devices in a vehicle. More particularly, and not by way of limitation, the present disclosure is directed to an apparatus, system, or method for mounting devices to a sun visor of a vehicle.

Description of Related Art

Police, law enforcement, emergency responders, businesses, and drivers or pilots in general now utilize some form of camera system in their vehicles, machinery, boats, or aircrafts. These camera systems are often utilized for data gathering, the taking of footage for evidence, entertainment from funny moments on the roads, in the air, or on the water, and/or used to monitor passengers, pets, children, or criminals.

While suction cups, and other mounting apparatuses, or systems, do allow for the cameras to capture some footage, they do not allow for the ability to capture all of the footage possible due to mounting positions, and/or the locations of connections such as power, and/or data storage. Additionally, these mounting systems often block significant portions of a driver's or pilot's viewing area, creating a safety hazard. Thus, it would be advantageous to have a system, apparatus, or method that overcomes those disadvantages of the prior art.

BRIEF SUMMARY

The present disclosure is a sun visor mounting apparatus having a mounting plate, a securing plate, a joining plate, and an extension plate, each of which is capable of and/or configured to receive a fastener for coupling or securing one or more of said plates.

Thus, in one aspect, the present disclosure is directed to a sun visor mounting system including a mounting plate with a J hooked end configured to receive a first side of a sun visor. Opposing the J hooked end can be a securing plate configured in a U shape for receiving a second side of the sun visor and also capable of coupling to the mounting plate. A joining plate configured in a V shape, with a first side of the joining plate capable of coupling to the mounting plate and a second side of the joining plate capable of coupling to an extension plate. The extension plate can have a first side coupled to the joining plate and a second side configured to engage against a fixed structure. One or more fasteners may be utilized with each plate to secure them together.

In another aspect, the present disclosure is directed to a method for installing a sun visor mount, including engaging a first side of a sun visor into a J hook portion of a mounting plate, and, once engaged, inserting a second side of the sun visor into a securing plate. To accommodate different sizes and configurations, the present disclosure can include extending a joining plate to a satisfactory position, causing an extension plate to engage with a fixed structure for the mounting plate's stability.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will be best understood by reference to the following detailed description of illustrative embodiments when read in conjunction with the accompanying drawings, wherein:

DETAILED DESCRIPTION

At least one embodiment of the disclosure will now be described. One disadvantage that camera mounting systems have is the lack of stability in mounting surfaces. The present disclosure addresses this by allowing for increased stability from an engagement with a windshield or other fixed structure while utilizing additional mounting points or locations that can increase the flexibility during utilization and/or safety of a user.

Figure 1A:
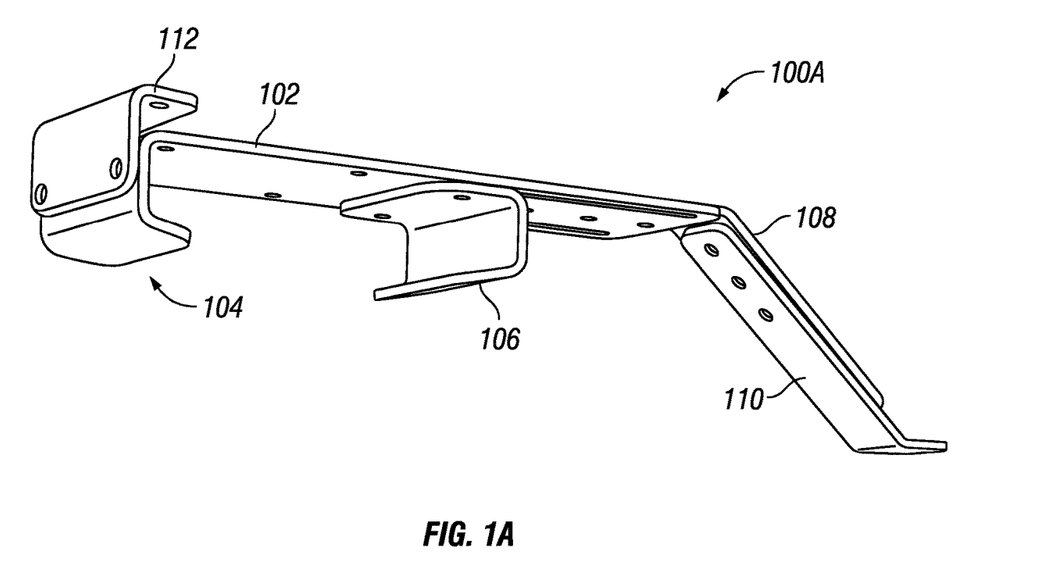
FIG. 1A is a lower perspective view illustration of a sun visor mounting system.

FIG. 1A is a lower perspective view illustration of a sun visor mounting system 100A. The sun visor mounting system 100A can include a mounting plate 102, a securing plate 106, a joining plate 108, an extension plate 110, and/or a second mounting plate 112. Each of these plates may interact with one or more of the adjacent and/or interconnected plates to allow for a securing or engagement with a sun visor (not illustrated) and/or a fixed structure (not illustrated).

For example, the mounting plate 102 allows for the coupling of devices to the sun visor mounting system 100A. These devices (not illustrated) may include Global Positioning System(s) (G.P.S.), camera system(s), radio(s), and/or other devices utilized by drivers, pilots, and/or other individuals operating vehicles and/or machinery. In at least one example, the mounting plate 102 has a portion or section 104 that is generally J shaped or J hook-shaped. The J or J hook shape allows the mounting plate to engage with a sun visor (not illustrated).

Figure 1B:
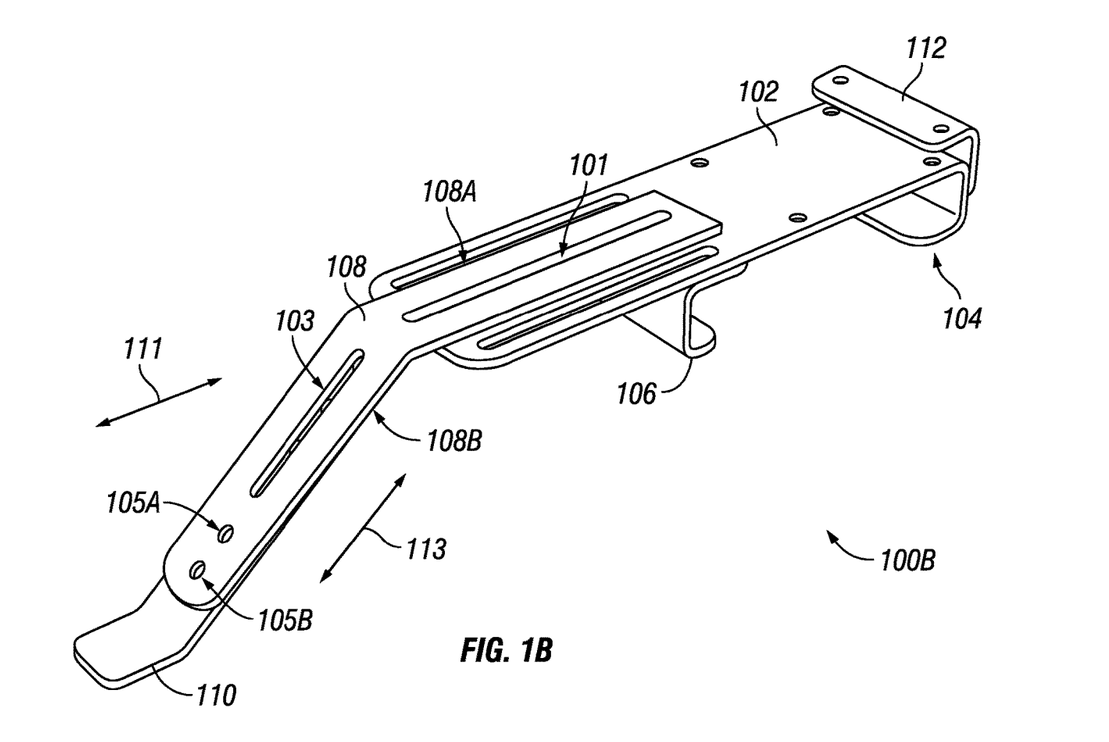
FIG. 1B is a front upper perspective view illustration of a sun visor mounting system.

FIG. 1B is a front perspective view illustration of a sun visor mounting system 100B. The sun visor mounting system 100B can include a mounting plate 102, a securing plate 106, a joining plate 108, an extension plate 110, and/or a second mounting plate 112. The mounting plate 102 can have a portion or section 104 that is J or J hook-shaped, which allows the mounting plate 102 to interface with a sun visor (not illustrated). The securing plate 106 can engage with the sun visor (not illustrated) opposite the J or J hook portion or section 104 of the mounting plate 102. In at least one example, the securing plate 106 is slidable with respect to the mounting plate 102. In other examples, the securing plate 106 may engage with the mounting plate 102 at one of a plurality of mounting positions.

The joining plate 108, in at least one embodiment, has two ends or sections 108A/108B. The first end or section 108A of the joining plate 108 can interface with the mounting plate 102. The second end or section 108B of the joining plate 108 may interface or engage with the extension plate 110. Each of the first end 108A and the second end 108B may have a set of apertures or slots that allow for the interfacing of the joining plate 108 to other plates. In at least one example, the first end 108A of the joining plate 108 can have a slot 101 or other aperture that allows for the movement of the joining plate 108 in relation to the mounting plate 102. The slot 101 can allow for a sliding or linear movement 111. For example, the linear or sliding movement 111 can allow for positioning of the joining plate 108 in relation to the mounting plate 102. The linear or sliding movement 111 may allow for the movement of the joining plate 108 in a direction that is opposite the J or J hook portion 104 of the mounting plate 102. Similarly, the second end 108B of the joining plate 108 can have a slot 103 and/or a set of apertures 105A/105B. The slot 103 allows for the interaction of the joining plate 108 with the extension plate 110. The interaction of the joining plate 108 and the extension plate 110, in at least one example, can include sliding or movement 113. The sliding or movement 113 may include movement of the extension plate 110 away or towards the joining plate 108. The set of apertures 105A/105B may be utilized to secure the joining plate 108 to the extension plate 110 or to a device or set of devices that may be coupled to the sun visor mounting system 100B. The slots and apertures discussed herein, generally, can allow fir acceptance, passage, and securing of fasteners or other securing means. For example, a fastener or removable fastener may be a threaded bolt with a corresponding threaded nut as a securing mechanism. A threaded bolt or fastener can have a helical ramp surrounding a cylinder.

Figure 1C:
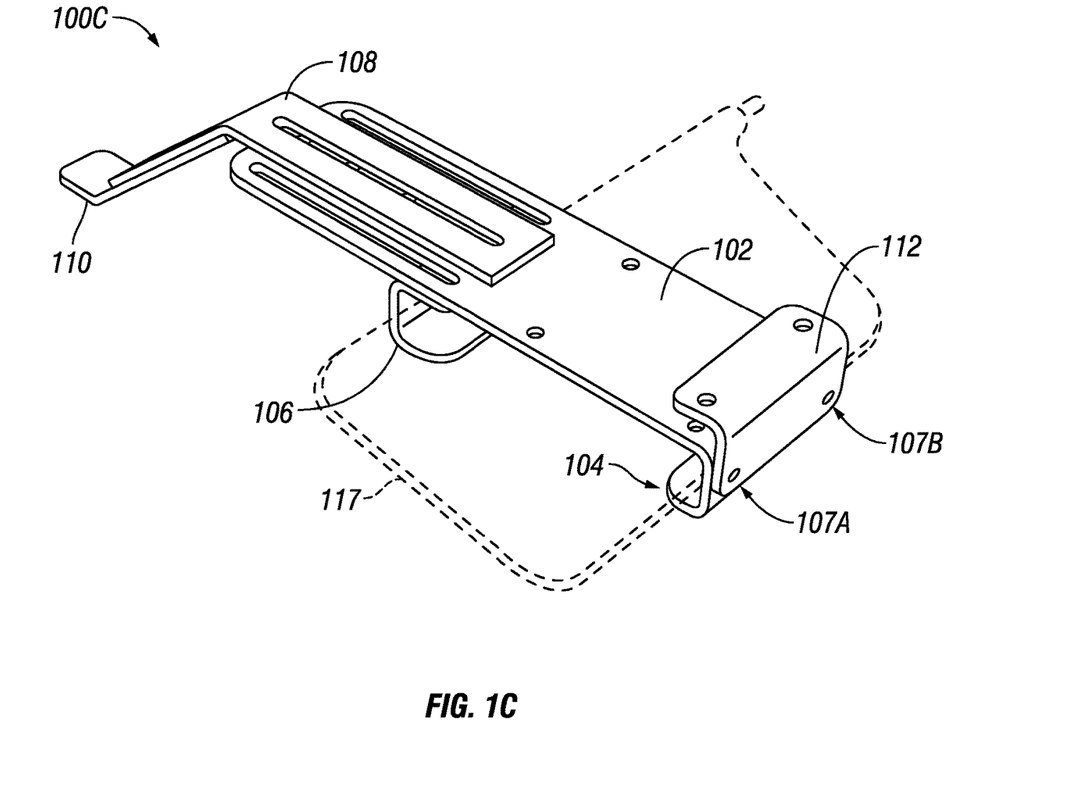
FIG. 1C is a rear perspective view illustration of a sun visor mounting system.

FIG. 1C is a rear perspective view illustration of a sun visor mounting system 100C. The sun visor mounting system 100C can include a mounting plate 102, a securing plate 106, a joining plate 108, an extension plate 110, and/or a secondary mounting plate 112. In at least one embodiment, the mounting plate 102 and securing plate 106 interact to engage with a sun visor 117. In at least one example, the sun visor 117 engages with the J or J hook section 104 of the mounting plate 102 and the U shaped securing plate 106. The J or J hook section 104 may also have a set of apertures (not illustrated) that correspond to a set of apertures 107A/107B defined by the second mounting plate 112. The set of apertures 107A/107B can allow for the coupling of the second mounting plate 112 to the mounting plate 102 utilizing a set of fasteners. The mounting plate 102 can be utilized as a stabilizing or general securing mount for a camera, camera system, Global Positioning System (G.P.S.), viewing system, or other device (not illustrated). In at least one example, the mounting plate 102 may also couple to cable management plate or system (not illustrated) for controlling and/or routing of cables for the camera or camera system or other devices coupled to the mounting plate 102. Similarly, the second mounting plate 112 may be utilized for mounting and/or coupling of devices such as, but not limited to, viewing screens, G.P.S. units, and/or data loggers to the sun visor mounting system 100C. The secondary mounting plate 112 can have a standoff section that allows for control of cables and/or connections to the devices mounted or coupled to the second mounting plate 112. In some examples, cable management may be achieved through apertures or coupling mechanisms coupled to the various plates.

Figure 2:
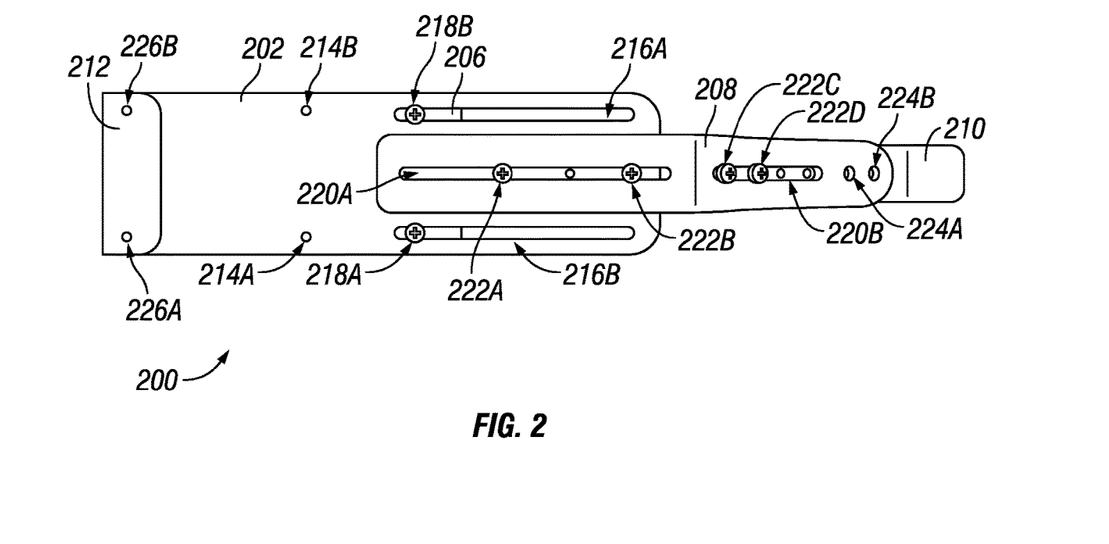
FIG. 2 is a top view illustration of a sun visor mounting apparatus.

FIG. 2 is a top view illustration of a sun visor mounting apparatus 200. The sun visor mounting apparatus 200 may be utilized within and/or as part of a stabilization or mounting system for cameras and other devices within a vehicle or other machinery. The sun visor mounting apparatus 200 can have a mounting plate 202 coupled to a joining plate 208, a securing plate 206, and/or a second mounting plate 212. The mounting plate 202 may define at least one slot 216A/216B, which in some examples may be referred to as a securing plate slot 216A and/or 216B. The slot(s) 216A/216B can allow for a fastener 218A/218B to pass through to a securing plate 206. The slots-216A/216B may also allow for the securing plate 206 to be moved and/or slide in relation to a portion of the mounting plate 202. For example, sun visors vary in size from one vehicle to the next, and accordingly, the mounting plates should be able to adjust to fit a majority of these sun visors.

The mounting plate 202, in at least one embodiment, may also define a set of apertures 214A/214B, each capable of receiving a fastener like those shown as 218A/218B. However, other forms of fasteners may also be utilized to allow the plates to be affixed to one another. The set of apertures 214A/214B are configured for placements and/or coupling of a camera or camera system (not illustrated) to the mounting plate 202. In some examples, the camera, camera system, or device coupled to the mounting plate 202 may have a fastener or other coupling device built into a mounting bracket or the device for accessing and coupling to the plates via the set of apertures 214A/214B.

The joining plate 208 may define a first slot 220A and/or a second slot 220B (collectively referred to as slots 220). The slots 220 can allow for fastener 222A, 222B, 222C, and/or 222D to pass through and interface with the mounting plate 202 and/or the extension plate 210. In at least one embodiment, the fasteners 222A/222B may be utilized to securing the joining plate 208 at a desired position in relation to the mounting plate 202, in the illustrated example, a position away from or towards the mounting plate 202. Similarly, the fasteners 222C/222D may be utilized to secure the extension plate 210 in a desired position. In the illustrated example, the position may be towards or away from the mounting plate 202. Additionally, the joining plate 208 may also define a set of apertures 224A and/or 224B. The set of apertures 224A/224B, in at least one example, may allow for devices to be coupled to the joining plate 208. For example, some cameras or camera systems may require a specific placement in relation to a windshield or other fixed structure to allow for proper image capture. Accordingly, it is beneficial to have multiple coupling points along the sun visor mounting system 200. Additionally, each vehicle can have different configurations that may require a camera or G.P.S. system to be positioned differently to allow the driver clear visibility through a windshield, one or more windows, and/or mirrors.

The secondary mounting plate 212 can also define a set of apertures 226A/226B. The set of apertures 226A/226B, in at least one example, may allow for devices to be coupled to the secondary mounting plate 212. For example, some cameras or camera systems may require a specific placement in relation to a windshield or other fixed structure to allow for proper image capture, or include a viewing screen to allow for monitoring of the current image capture. Accordingly it is beneficial to have multiple coupling points along the sun visor mounting system 200.

Figure 3:
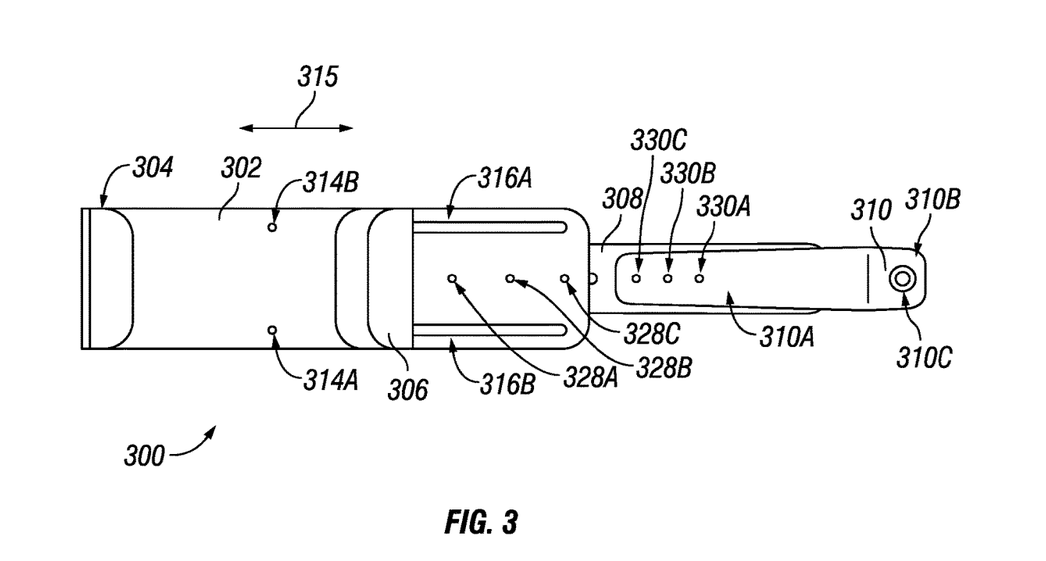
FIG. 3 is a bottom view illustration of a sun visor mounting apparatus.

FIG. 3 is a bottom view illustration of a sun visor mounting apparatus 300. The sun visor mounting apparatus 300 can include a mounting plate 302, a securing plate 306, a joining plate 308, and/or an extension plate 310. In at least one embodiment, the mounting plate 302 may have a J or J hook-shaped portion or section 304. The J hook section 304, in at least one example, opposes a U shaped securing plate 306. The J hook section 304 and the securing plate 306 are configurable to engage with a sun visor (not illustrated). The sliding or movement of the securing plate 306 can be achieved through one or more of the slot(s) 316A and/or 316B defined by the mounting plate 302 and a set of fasteners that pass through one or more of the slot(s) 316A and/or 316B. For example, a fastener (not illustrated) may pass through the securing plate 306, and the mounting plate 302 via a slot 316A/316B with the fastener have a securing mechanism that allows for the fastener to create a friction, pressing, or locking fit connection between the securing plate 306 and the mounting plate 302. Similarly, the joining plate, extension plate, and/or secondary mounting plate may have a friction, pressing, or locking fit connection between them. The mounting plate 302, in at least one embodiment, may also define a set of apertures 314A/314B, each capable of receiving a fastener like those shown as 218A/218B. The set of apertures 314A/314B are configured for placements and/or coupling of a camera or camera system (not illustrated) to the mounting plate 302. In some examples, the camera, camera system, or device coupled to the mounting plate 302 may have a fastener built into a mounting bracket or device for accessing the set of apertures 314A/314B. The securing plate 306 may be slidable or moved 315 in reference to the mounting plate 302 via the slots 316A and/or 316B.

The mounting plate 302 may also define a set of apertures 328A/328B/328C that allow for a camera system to be coupled to the mounting plate 302. The set of apertures 328A, 328B, and/or 328C can also allow for the coupling of the mounting plate 302 to a joint plate 308. Additionally, the set of apertures 328A, 328B, and/or 328C can allow for additional plates to be secured to the mounting plate 302. In some embodiments, the securing of a device or plates may be performed through fasteners or other types of securing means. The joining plate 308 can then be coupled to the mounting plate 302 and/or an extension plate 310. For example, the joining plate 308 may have a slot (not illustrated) that a fastener may pass through for engaging with one or more of the set of apertures 328A/328B/328C. Similarly, the joining plate 308 can have a slot or apertures (not illustrated) that can allow for a fastener to engage with a set of apertures 330A/330B/330C of the extension plate 310. The extension plate 310 may have a first side 310A and a second side 310B. In at least one example, the sides 310A/310B may also be referred to as sections. In at least one embodiment, the second side 310B may also have a vibration reduction pad 310C affixed to it. The vibration reduction pad 310C may also be a dampening pad, sticky pad, or other pad-like devices or structures to allow the extension plate 310 to be pressed, engaged, and/or affixed to a fixed structure or object.

Figure 4:
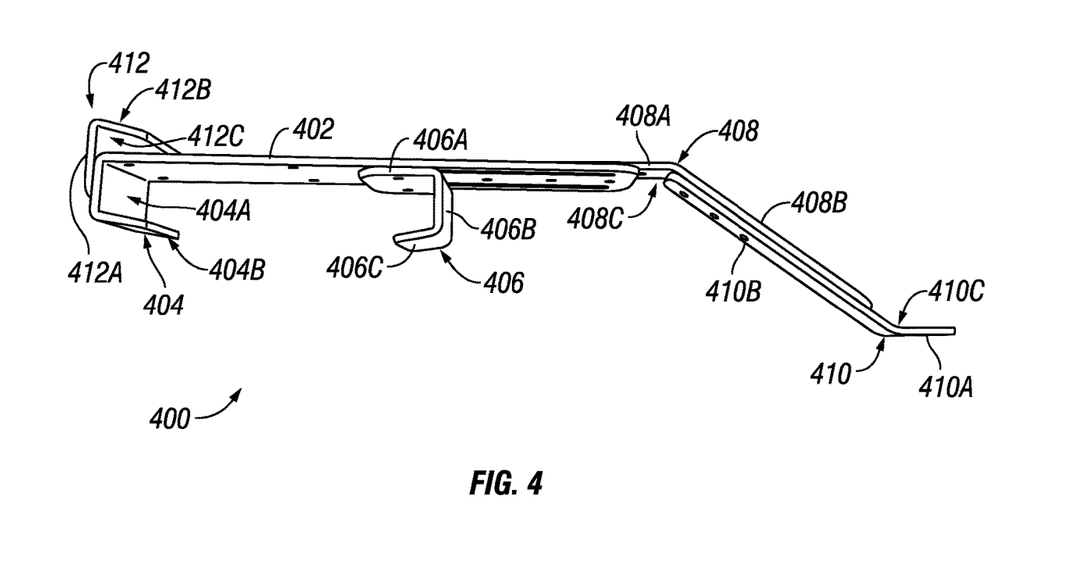
FIG. 4 is a side view illustration of a sun visor mounting apparatus.

FIG. 4 is a side view illustration of a sun visor mounting apparatus 400. The side view illustration of the sun visor mounting apparatus 400 allows for the shapes and/or organization of the various plates and/or components of the apparatus. A mounting plate 402 is generally a single flat piece or plate with a generally rectangular cross-section. The mounting plate 402 may also have a portion or section 404 that is generally J or J hook-shaped to allow for engagement with a sun visor (not illustrated). The J or J hook portion or section 404 is part of the mounting plate 402 with a first section 404A that is generally at a right angle or ninety degrees respective to the mounting plate 402. A second section 404B of the J or J hook portion 404 is generally at an angle greater than a right angle or ninety degrees from the first section 404A and generally not more than one-hundred and thirty-five degrees from the first side 404A. The second section, 404B, may also be at an angle that is greater than one-hundred and eighty degrees from the mounting plate 402.

A securing plate 406 has a generally U shape, with one section configured to interface with the mounting plate 402 and the other sections configured to assist in securing a sun visor (not illustrated). The securing plate 406 can have a first section 406A that is configured to be generally parallel to the mounting plate 402. A second section 406B of the securing plate 406 can generally be configured at a right angle or ninety-degree angle to the first section 406A. A third section, 406C, is generally parallel or more than parallel to the first section 406A. The third section 406C may be at a right angle or ninety degrees to the second section 406B but will generally be no more than one-hundred thirty-five degrees from the second section 406B.

A joining plate 408 may have a first section 408A and a second section 408B. The first section 408A may allow for coupling to the mounting plate 402, and the second section 408B can allow for coupling to the extension plate 410. The joining plate 408 is generally configured in a V shape with an obtuse (greater than ninety degrees) angle 408C. In at least one example, the second section 408B of the joining plate 408 may be of a length equal to or less than a section of an extension plate 410. Much like the joining plate 408, the extension plate 410 has a first section 410A and a second section 410B. The first section 410A may be sized to allow for a vibration reduction pad or other form of sticky or affixable pad that may reduce, or eliminate vibrations, and/or allow for increased stability of the extension plate 410 against a fixed structure. The size of the first section 410A is generally less than, or much shorter than the second section 410B. The second section 410B is generally equal to or greater than the second section 408B of the joining plate 408. Additionally, the extension plate 410 is generally shaped like a checkmark, with an angle 410C between the first section 410A and the second section 410B. The angle 410C is generally an obtuse angle.

A secondary mounting plate 412 can allow for additional devices and/or systems to be coupled to the sun visor mounting apparatus 400. The secondary mounting plate 412 is generally shaped like a V, with an acute angle 412C. A first side 412A of the secondary mounting plate 412 is generally of a sufficient length to create a standoff position with a second section 412B when the first section 412A is coupled to the mounting plate 402 and/or the J or J hook section 404. In at least one embodiment, the first section 412A and the second section 412B are of a same or similar length, while in other examples, the first section 412A is longer than the second section 412B.

Figure 5:
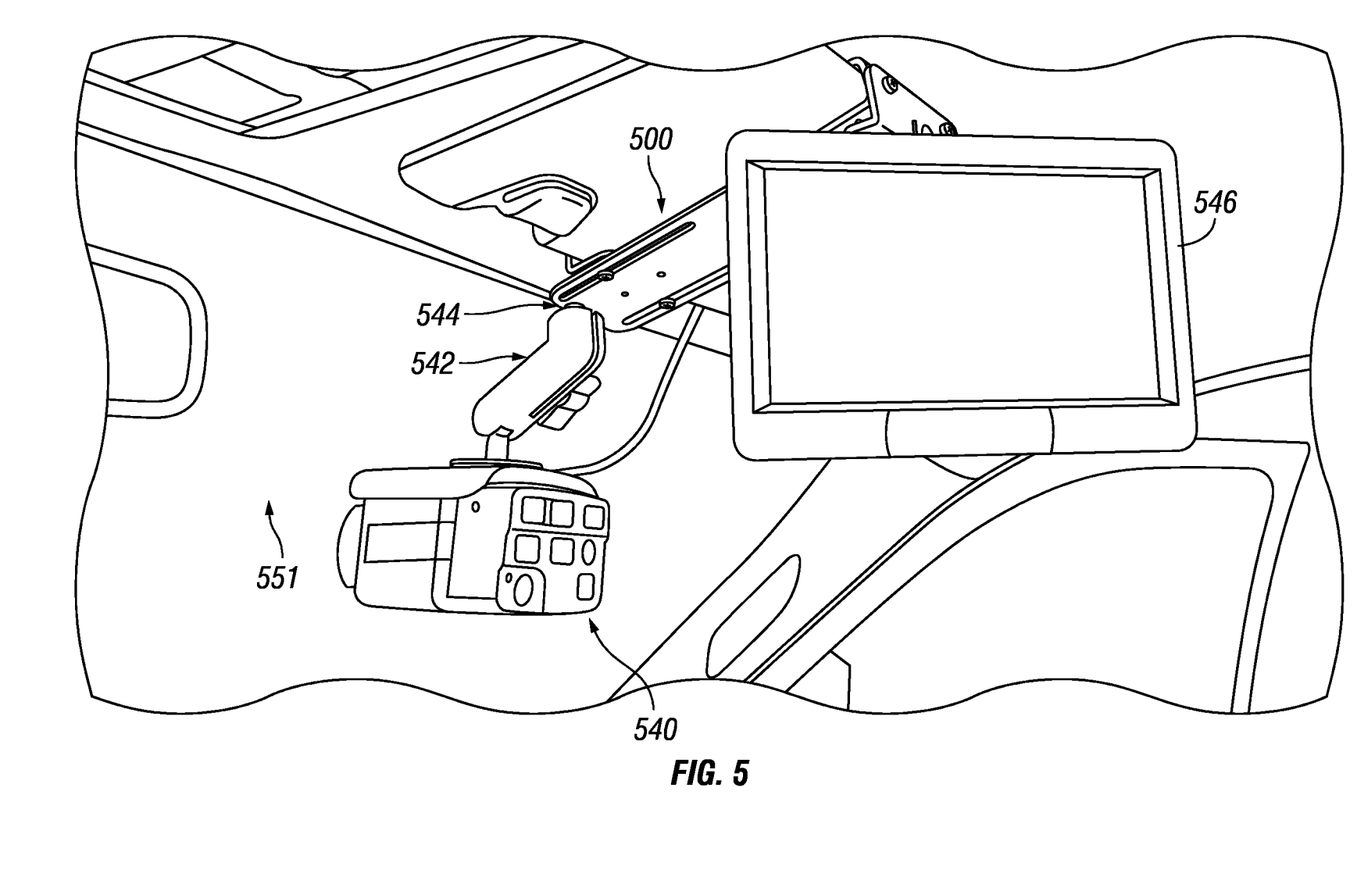
FIG. 5 is an illustration of a sun visor mounting system configured for use with multiple devices.

FIG. 5 is an illustration of a sun visor mounting system 500 in use with multiple devices. For example, the sun visor mounting system 500 may be coupled to a camera 540 and/or a screen 546. Each camera 540 or camera system may be an articulation system 542 and/or an attachment bracket 544. The articulation system 542 may allow for the positioning and/or placement of the camera 540. In at least one example, the camera 540 is positioned in such a way to capture images through a windshield 551. In other examples, the camera 540 may be positioned to capture images within the vehicle.

Figure 6:
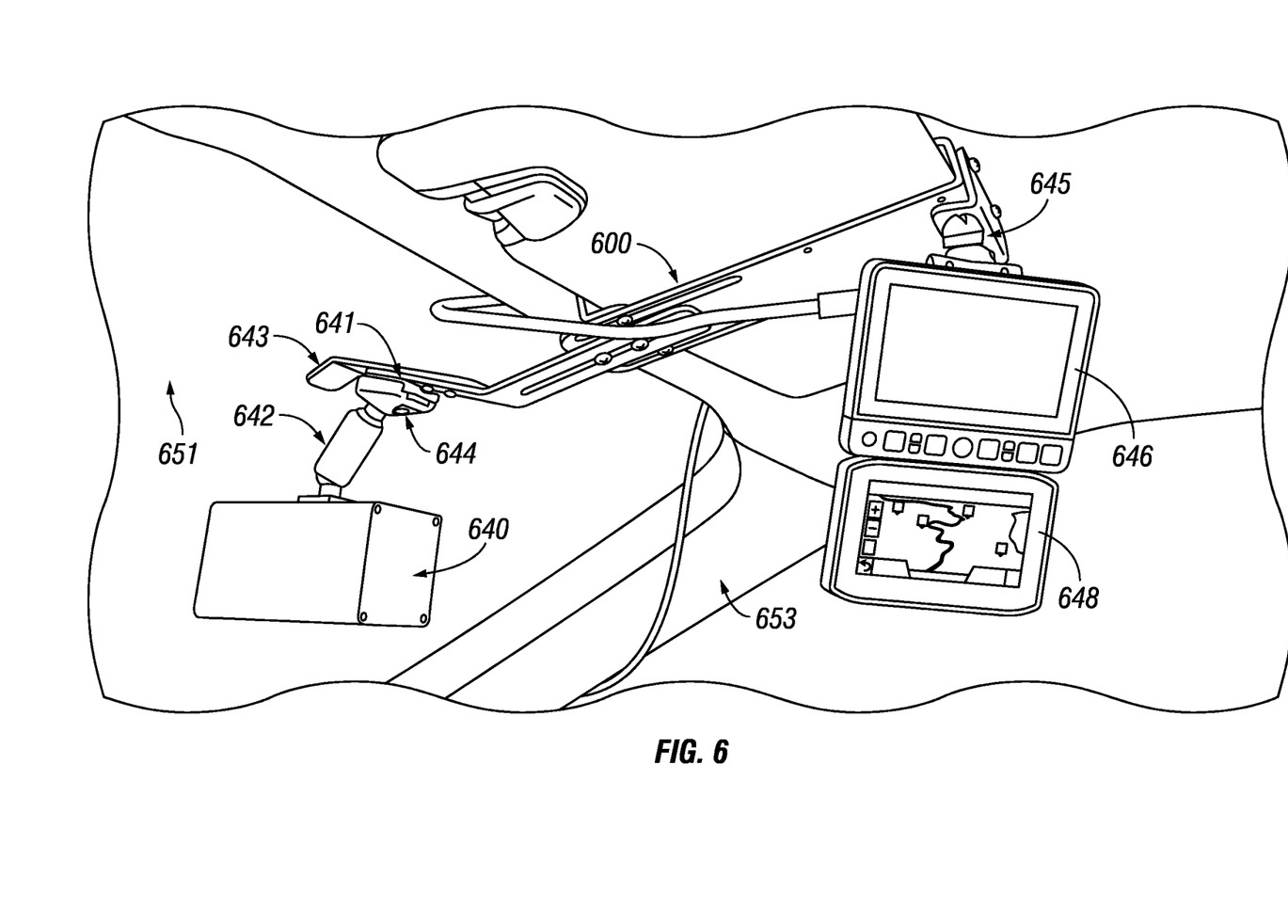
FIG. 6 is an illustration of a sun visor mounting apparatus in use with multiple devices.

FIG. 6 is an illustration of a sun visor mounting apparatus 600 in use with multiple devices. For example, the sun visor mounting system 600 may couple to a camera 640, a screen 646, and/or a G.P.S. unit 648. In at least one embodiment, the camera 640 may be coupled to the sun visor mounting system 600 through an articulation system 642, a camera bracket 644, and/or a stabilizing bracket 641. The stabilizing bracket 641 can allow for various camera(s) 640 and/or articulation systems 642 to couple with the sun visor mounting system 600 with minimal vibrations as the shape and/or contour of the stabilizing bracket allows for the camera bracket 644 to seat firmly.

The sun visor mounting system 600 may also be engaged with a windshield 651, at a stabilization point 643. In at least one example, the sun visor mounting system 600 may include a vibration reduction pad (not illustrated) or other padding or adhesive pad that allows for engagement and/or interaction with the windshield 651. In some examples, the engagement or interaction may be with a support beam 653 or a partition.

Much like the camera system, the screen 646 and/or G.P.S. unknit 648 may also be coupled with a device bracket 645. The device bracket 645 may allow for the stabilization of devices as well as providing a quick connection and/or release system for various devices. For example, a police officer utilizing a G.P.S. unit, or G.P.S. tracking unit, may need to get out of the vehicle and move on foot to a specific area and needs to keep the G.P.S. unit with him, a quick-release system can allow for him to remove the unit from the vehicle and then replace it upon returning to the vehicle.

Figure 7:
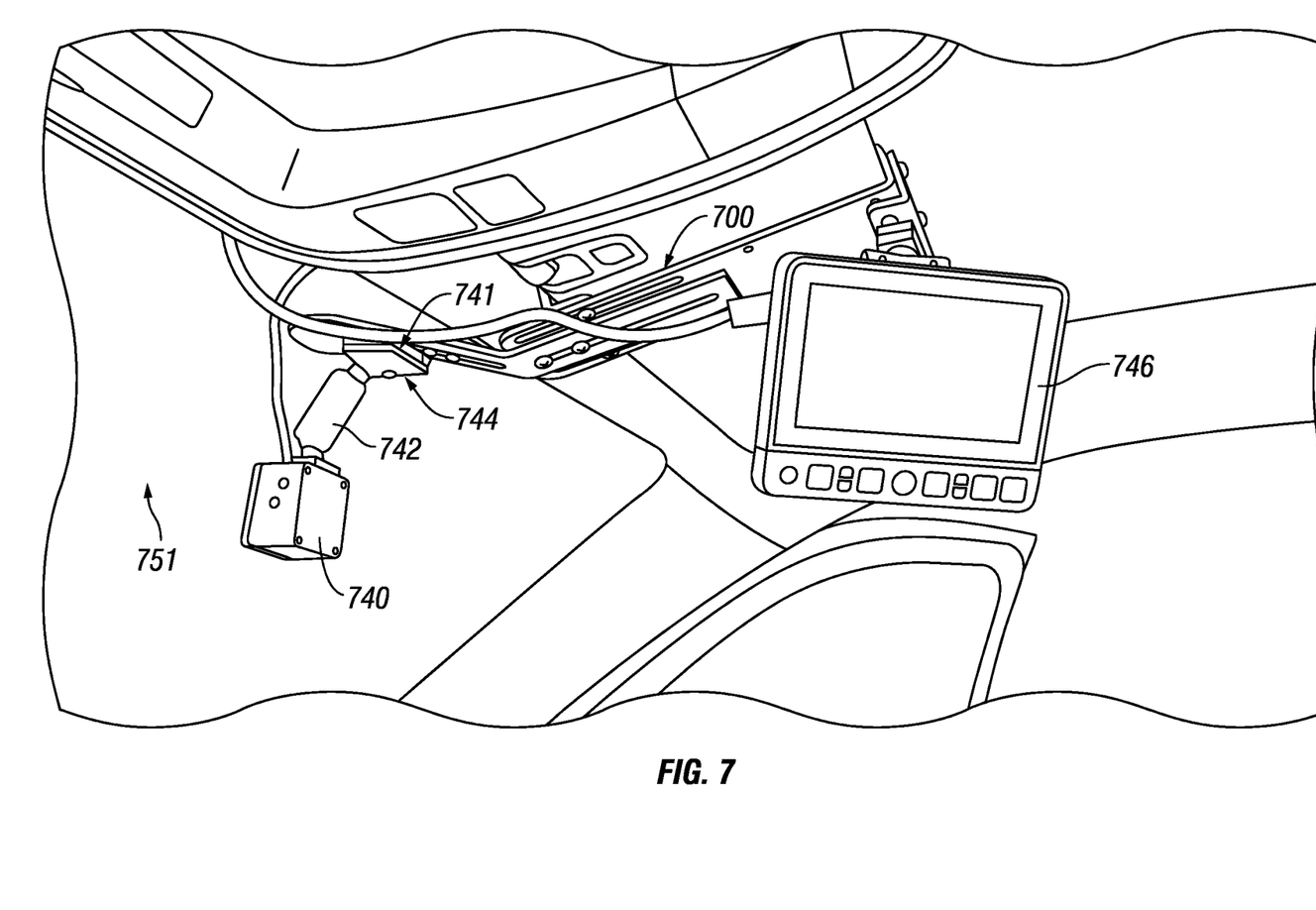
FIG. 7 is an illustration of a sun visor mounting apparatus utilized with multiple devices.

FIG. 7 is an illustration of a sun visor mounting apparatus 700 utilized with multiple devices. For example, the sun visor mounting system 700 may be coupled to a camera 740 and/or a screen 746. Each camera 746 or camera system may be an articulation system 742 and/or an attachment bracket 744. The articulation system 742 may allow for the positioning and/or placement of the camera 740. In at least one example, the camera 740 is positioned in such a way to capture images through a windshield 751. In other examples, the camera 740 may be positioned to capture images within the vehicle.

In at least one embodiment, the camera 740 may be coupled to the sun visor mounting system 700 through an articulation system 742, a camera bracket 744, and/or a stabilizing bracket 741. The stabilizing bracket 741 can allow various camera(s) 740 and/or articulation systems 742 to couple with the sun visor mounting system 700 with minimal vibrations as the shape and/or contour of the stabilizing bracket allows for the camera bracket 744 to seat firmly against the coupling device.

Some cameras 740, such as commercially available dash cameras, may require additional data and/or interface to allow them to be effective. For example, to be effective evidence in some courts, a G.P.S. logger data output must be timestamped with the video from the camera. In other examples, a G.P.S. unit must be visible in the video frame. This can be difficult to achieve without proper organization. The sun visor mounting apparatus 700 allows for such organization through the various mounting positions of the camera 740 and/or screen 746 or other devices.

Figure 8A:
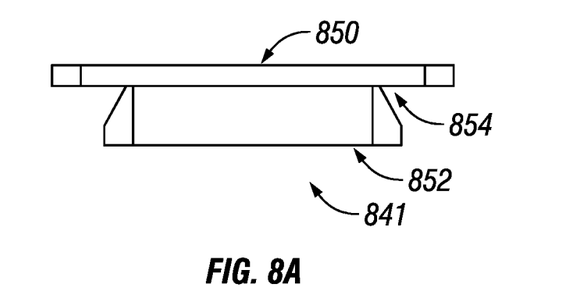
FIG. 8A is a lengthwise view illustration of stabilizing bracket.
Figure 8B:
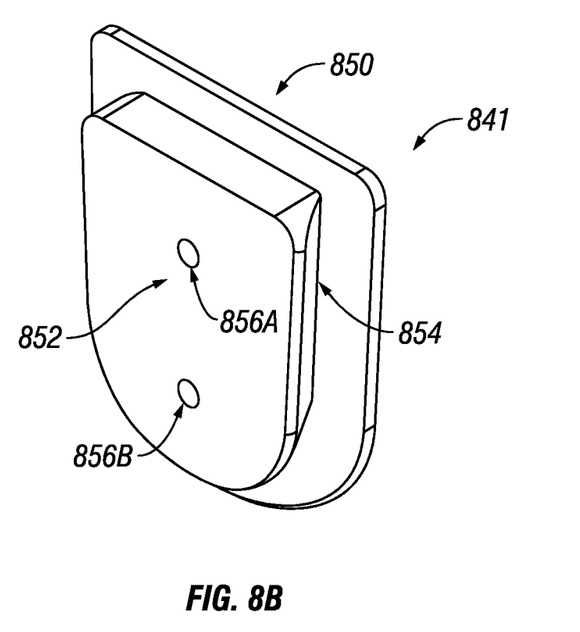
FIG. 8B is a lower perspective view illustration of a stabilizing bracket.

FIG. 8A is a lengthwise view illustration of stabilizing bracket 841. FIG. 8B is a lower perspective view illustration of a stabilizing bracket 841. With respect to FIGS. 8A and 8B, the stabilizing bracket 841 can be universal fit devices for securing and/or stabilizing camera attachment brackets. The stabilizing bracket 841 can have a top section 850 that can be coupled to a lower section 852. The lower section 852 can have a ramped or angled edge 854. The ramped or angled edge 854 can, in at least one example, be configured to match a corresponding ramped or angled edge (not illustrated) on a camera or camera system bracket (not illustrated). The bottom section 852 and/or top section 850 may define a set of apertures 856A and/or 856B for coupling the stabilizing bracket to the sun visor mounting system or apparatus (not illustrated). In at least one example, the top section 850 can have a plate-like structure with a rectangular portion and a curved front or nose portion. Similarly, further to this example, the bottom section 852 can have a rectangular portion with an angled edge(s) 854, and a curved front or nose portion with an angled edge(s) 854.

Figure 9:
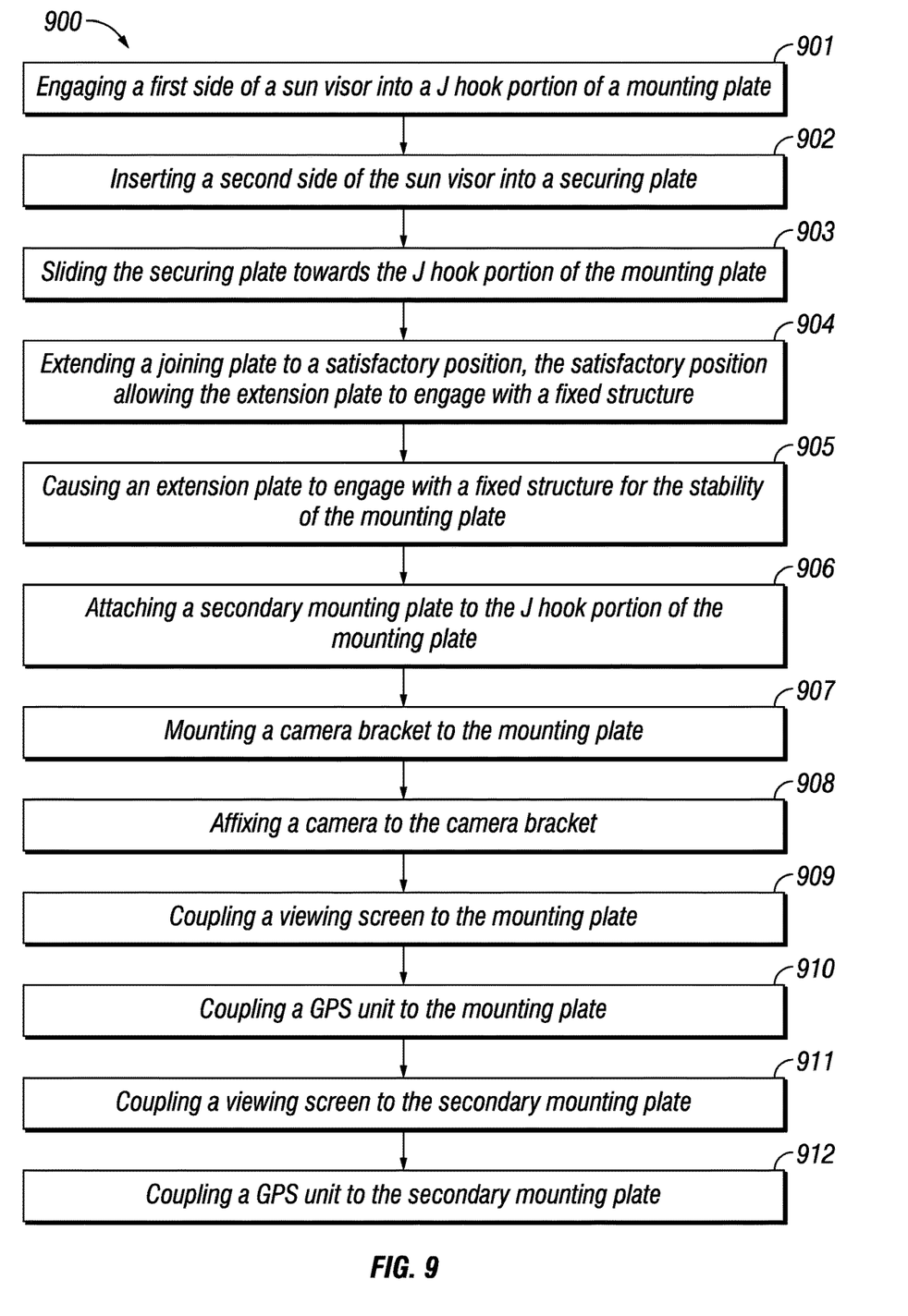
FIG. 9 is an illustration of a sun visor mounting system installation method.

FIG. 9 is an illustration of a sun visor mounting system installation method 900. The installation method 900, may in at least one embodiment, begin initially with engaging a first side of a sun visor into a J hook portion of a mounting plate 901. The J hook portion of the mounting plate, in at least one example, is sized and configured to accept at least one side of a sun visor. At least one side of a sun visor will typically be along the major axis of a sun visor such that when the sun visor is utilized for shade purposes by an individual, it is the side or edge closest to the user or the ceiling of a vehicle. In at least one example, inserting a second side of the sun visor into a securing plate 902 may occur. In some examples, sliding the securing plate towards the J hook portion of the mounting plate 903 steps may occur where the securing plate is slidably coupled to the mounting plate. Another step can include extending a joining plate to a satisfactory position, the satisfactory position allowing the extension plate to engage with a fixed structure 904. The joining plate can allow, individually or in combination with an extension plate for engagement with a fixed structure. Thus, another step that can occur is causing an extension plate to engage with a fixed structure for the stability of the mounting plate 905.

The mounting plate may also couple to a second mounting plate by attaching a secondary mounting plate to the J hook portion of the mounting plate 906 step. Other devices may be attached, mounted, and/or coupled to the mounting plate or secondary mounting plate. For example, mounting a camera bracket to the mounting plate 907 and/or affixing a camera to the camera bracket 908 step may occur. Other examples may also include or involve coupling a viewing screen to the mounting plate 909, coupling a G.P.S. unit to the mounting plate 910, coupling a viewing screen to the second mounting plate 911, and/or coupling a G.P.S. unit to the second mounting plate 912 step. Any of these devices may be mounted, affixed, and/or coupled in any individual capacity or combination.

It would be understood that one or more of the plates of the present disclosure may be combined together as one plate. For example, the extension plate and joining plate may be modified and/or combined through adhesives or other combination means such as welding or a welding like manner to create a single plate. Additionally, one or more of the plate may be coupled to the sun visor through adhesive, hook and loop, fasteners, and/or other attachment or affixing means.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only and not limitation. Thus, the breadth and scope of this disclosure should not be limited by any of the above-described exemplary embodiments but should be defined only in accordance with any claims and their equivalents issuing from this disclosure. Furthermore, the above advantages and features are provided in described embodiments but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field", the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure but should not be constrained by the headings set forth herein.

We claim:

1. A sun visor mounting apparatus comprising:
    a mounting plate;
    a securing plate coupled to the mounting plate, the securing plate allowing for engagement of a sun visor between the mounting plate and the securing plate;
    a joining plate coupled to the mounting plate; and
    an extension plate coupled to the joining plate, wherein the extension plate is generally shaped as a checkmark;
    wherein at least one removable fastener is utilized for coupling each of said plates.

2. The sun visor mounting apparatus of claim 1, further comprises a camera bracket capable of being mounted to the mounting plate.

3. The sun visor mounting apparatus of claim 1, further comprises a secondary mounting plate configured to couple with the mounting plate.

4. The sun visor mounting apparatus of claim 1, wherein the extension plate has a first end and a second end.

5. The sun visor mounting apparatus of claim 4, wherein affixed to the second end of the extension plate is a vibration reduction pad.

6. The sun visor mounting apparatus of claim 1, wherein the mounting plate is generally J shaped at a first end.

7. The sun visor mounting apparatus of claim 1, wherein the securing plate is generally U shaped.

8. The sun visor mounting apparatus of claim 1, wherein the joining plate is generally V shaped, and having an obtuse angle.

9. The sun visor mounting apparatus of claim 1, wherein said plates each have at least one aperture for receiving one or more of the at least one fasteners.

10. A sun visor mounting system comprising:
    a mounting plate with a J hooked end for receiving a first side of a sun visor;
    a securing plate configured in a U shape for receiving a second side of the sun visor and being coupled to the mounting plate;
    a joining plate generally configured in an obtuse V shape with a first side coupling to the mounting plate;
    an extension plate coupled to a second side of the joining plate, the extension plate having a first side of a length generally equal to the second side of the joining plate, and
    a second side at a fixed angle and length configured to create stability against a fixed structure;
    wherein at least one removable fastener is utilized for coupling of said plates.

11. The sun visor mount system of claim 10, wherein the securing plate is slidable in relation to the J hooked end of the mounting plate.

12. The sun visor mount system of claim 10, wherein the joining plate is slidable in relation to the mounting plate.

13. The sun visor mount system of claim 10, wherein the extension plate is slidable in relation to the joining plate.

14. The sun visor mount system of claim 10, wherein the mounting plate is configured to receive a camera bracket.

15. The sun visor mount system of claim 14, wherein a camera is coupled to the camera bracket.

16. The sun visor mount system of claim 10, wherein the fixed structure is a windshield.

17. The sun visor mount system of claim 10, wherein the fixed structure is a partition.

18. The sun visor mount system of claim 10, wherein the fixed structure is a support beam of a vehicle.

19. The sun visor mount system of claim 10, further comprising a secondary mounting plate configured to be coupled to the J hooked end of the mounting plate.

* * * * *